US006710895B1

(12) United States Patent
Gatto et al.

(10) Patent No.: US 6,710,895 B1
(45) Date of Patent: Mar. 23, 2004

(54) COMPACT CONFIGURABLE SCANNING COMPUTER TERMINAL

(75) Inventors: Jean-Marie Gatto, London (GB); Thierry Brunet De Courssou, Palo Alto, CA (US)

(73) Assignee: Cyberscan Technology, Inc., Palo Alto, CA (US)

( * ) Notice: Subject to any disclaimer, the term of this patent is extended or adjusted under 35 U.S.C. 154(b) by 0 days.

(21) Appl. No.: 09/441,040

(22) Filed: Nov. 16, 1999

(51) Int. Cl.⁷ .............................................. G06K 15/00
(52) U.S. Cl. ......................................... 358/1.6; 358/1.1
(58) Field of Search ...................... 358/1.1, 1.6, 1.12, 358/296, 471, 498; 400/611, 612, 613, 615.2, 70, 76, 83; 271/21; 242/364; 235/7 R

(56) References Cited

U.S. PATENT DOCUMENTS

| | | |
|---|---|---|
| 5,081,579 A | 1/1992 | Komai |
| 5,642,948 A | 7/1997 | Harris |
| 5,900,614 A | 5/1999 | Nakakawaji |
| 6,091,510 A | 7/2000 | Kazo |
| 6,105,866 A | 8/2000 | Morrison |
| 6,126,340 A | * 10/2000 | Ono et al. ..................... 400/70 |

\* cited by examiner

*Primary Examiner*—Arthur G. Evans
(74) *Attorney, Agent, or Firm*—Young Law Firm, P.C.

(57) ABSTRACT

A compact transactional document-scanning terminal that provides the means to conveniently capture an electronic image of most forms of printed documents at distributed locations, to capture either automatically from the scanned document or manually by operator interactivity all necessary process parameters or codes, to perform an electronic transaction in order to forward all the information to a remote computer or alternatively for local storage within the terminal, and to produce an electronic receipt and/or a paper receipt as a proof that the scan and store transaction has been successful and for later retrieval of information associated with the scanned document. The compact transactional document-scanning terminal may be configured to respond to various customer specifications. For some forms of documents, an image analysis is immediately performed subsequent to the scan in order to extract all or part of the printed information, apply recognition algorithms to decode information and complete automatically the transaction without further human intervention.

33 Claims, 13 Drawing Sheets

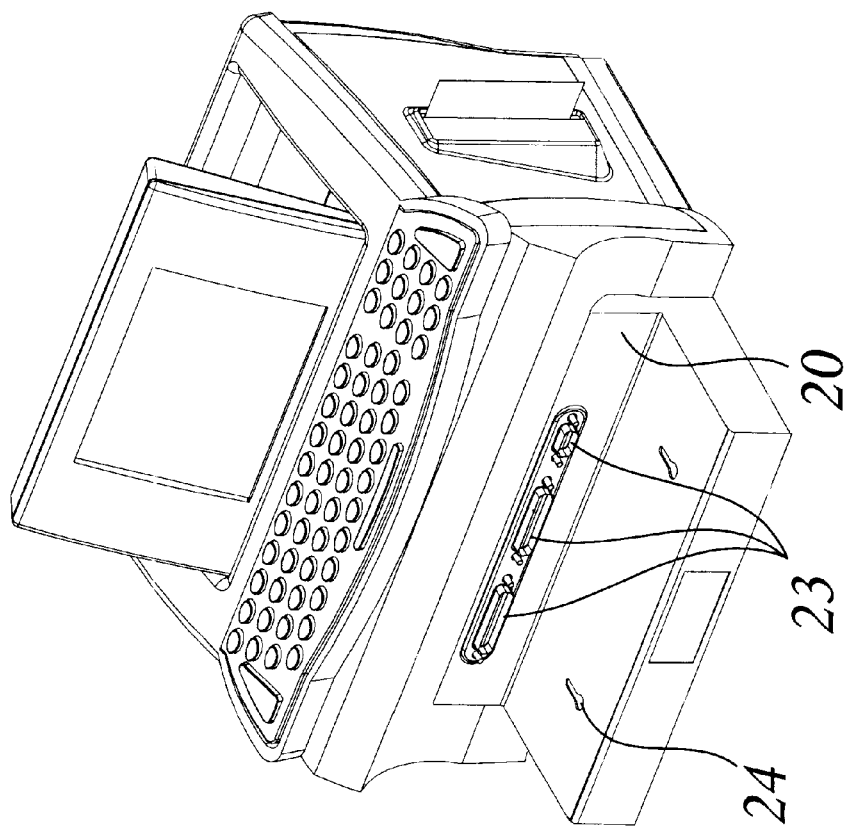
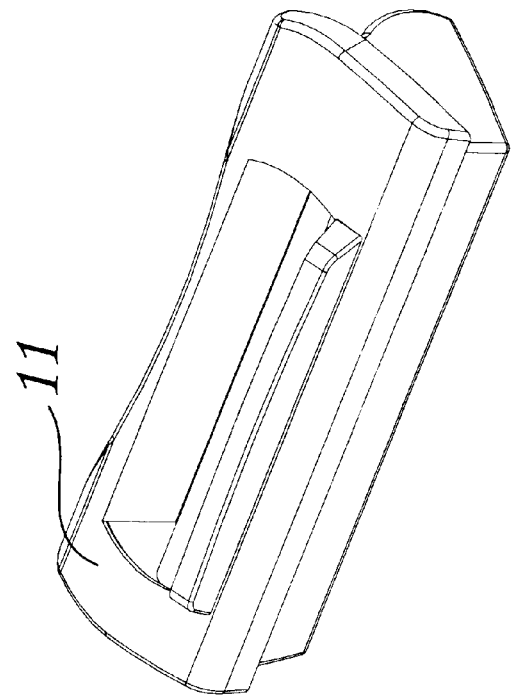
FIG. 2

COMPACT CONFIGURABLE SCANNING COMPUTER TERMINAL

BACKGROUND OF THE INVENTION

1. Field of the Invention

The invention pertains to the field of computer terminals and peripherals. More particularly, the present invention relates to document scanning computer peripherals and to computer terminals including such document scanners.

2. Description of the Related Art

The long heralded advent of the paperless office has so far failed to materialize. In fact, the advent of small and powerful computers has actually led to an increase in the amount of paper generated. A small footprint, heavy-duty and high performance document scanner is, therefore, an extremely desirable peripheral that would aid organizations to streamline document capture, processing and archiving operations. Traditionally, in large organizations, documents are scanned using large high-volume document scanners, which because of their high complexity and high price, are located in a specialized centralized department staffed with operators that have neither knowledge of nor responsibility for the content of the documents scanned. The alternative to such large scanners are desktop scanners. However, currently available desktop scanners have thus far largely been relegated to home uses due in part to their slow performance. What are needed, therefore, are small footprint, heavy-duty and high performance document scanning terminals suitable for desktop use in business enterprise environments.

For important documents that are scanned, the original paper copy of the document often must be accessible for reference, thus requiring large centralized storage space with sophisticated environmental control equipment. However, in order to improve efficiency, there is growing pressure to eliminate the need to access the archived original paper copy. The person performing the document capture, therefore, should be responsible for ensuring that the document is properly scanned, that any information, parameters or codes associated with the document are captured and that an electronic receipt and/or a paper receipt is produced as proof that the scanning operation has been successfully completed. What are also needed, therefore, are document scanners that generate an electronic and/or paper receipt for the documents that are scanned.

Many document scanner currently on the market have a unitary construction, featuring a single, non-modifiable configuration. However, such a configuration might not be appropriate for all uses or for all users. What is also needed, therefore, are scanning terminals that are modular in construction, affording users the ability to configure the scanning terminal according to their needs and budgets.

SUMMARY OF THE INVENTION

An object of the present invention, therefore, is to provide small footprint, heavy-duty and high performance document scanning terminals suitable for desktop use. It is another object of the present invention to provide document scanners that generate an electronic and/or paper receipt for the documents that are scanned. A still further object of the present invention is to provide scanning terminals that are modular in construction, affording users the ability to configure the scanning terminal to their needs and budgets.

In accordance with the above-described objects and those that will be mentioned and will become apparent below, a terminal according to an embodiment of the present invention comprises a display module; a document scanning module; a cylindrical paper roll rotatably mounted on a spindle within the terminal such that flat edges of the roll are substantially parallel to a base surface of the terminal; a receipt printer assembly, the receipt printer assembly being adapted to print a receipt of a document scanning operation on paper from the cylindrical paper roll, and control and processing electronics, the control and processing electronics being coupled to and controlling an operation of at least the display module, the document scanning module and the receipt printer assembly.

According to other embodiments of the invention, the terminal may further comprise a sliding tray supporting the receipt printer assembly and the cylindrical paper roll, the tray being adapted to slide from a first position wherein the paper roll and the receipt printer assembly are disposed within the terminal and a second position wherein both the receipt printer assembly and the paper roll are exposed to allow substantially unencumbered access thereto. A handle may be attached to the sliding tray for manually pushing and pulling the sliding tray into and out of the terminal. The sliding tray may be travel-limited to prevent the sliding tray from being pulled out too far and tipping the terminal. The terminal may further comprise a pivoting terminal door and a paper exit guide mounted within the pivoting terminal door, the printed receipt being fed through the paper exit guide. The receipt printer assembly may print a readable code on the receipt linking the printed receipt to information obtained from the document scanning operation. The terminal may further comprise a code reader configured to read the printed code, to thereby access the information obtained from the document scanning operation. The code reader may include a barcode reader. The barcode reader may include a laser barcode reader and/or a CCD bar code reader, for example. The receipt printer assembly may include a read-after-print mechanism to detect printing failures. A communications interface adapted to allow the terminal to communicate with a remote computer may also be provided. The terminal may further comprise a smart chip reader coupled to and controlled by the control and processing electronics. The terminal may further include a keyboard module and/or a display coupled to the control and processing electronics. At least the display and document scanning modules may include quick release interlocking clips that allow the modules to be attached to or separated from one another and/or a terminal base. A cover to which the display module is fitted may be provided, the cover being dimensioned to a size of the display module. The receipt printer assembly may include a printer of a type selected from a group including thermal print, impact, electric burning and arcing and ink jet types, for example.

The present invention may also be viewed as a document scanning terminal, comprising a scanning module and a receipt printer assembly module adapted to print a receipt of a scanning operation from paper fed to the printer assembly by a cylindrical paper roll, the cylindrical paper roll being disposed within the terminal such that flat edges of the roll are substantially parallel to a base surface of the terminal.

According to further embodiments of the document scanning terminal, the receipt printer may print a readable code on the receipt, the code linking the printed receipt to information obtained from a scanning operation carried out by the scanning module. The terminal may further comprise a code reader adapted to read the code, to thereby access the information obtained from the scanning operation. The scanning terminal may further comprise a terminal base, a terminal casing removably fitted to the terminal base, the terminal casing enclosing the receipt printer assembly, and a terminal cover removably fitted on the terminal casing. The scanning terminal may further comprise a sliding tray mounted to the terminal base, the sliding tray supporting the receipt printer assembly and the cylindrical paper roll, the tray being adapted to slide from a first operative position wherein the paper roll and the receipt printer assembly are enclosed within the terminal casing and a second paper loading and servicing position wherein both the receipt printer assembly and the paper roll are accessible outside the terminal casing. The terminal casing may comprise a pivoting door, the door being open when the tray is in the second position. The receipt printer assembly and the cylindrical paper roll may alternatively be mounted to the terminal base and the cylindrical roll of paper may be loaded by detaching the terminal cover from the terminal casing and/or removing the terminal casing from the terminal base. The scanning module, the terminal base, the terminal casing and the terminal cover may each include quick release interlocking clips allowing the scanning module, the terminal base, the terminal casing and the terminal modules to be attached to or separated from one another. The scanning terminal may further comprise control and processing electronics housed in the terminal base, the terminal base and the scanning module including mating integrated power and control connectors to electrically couple the scanning module to the control and processing electronics. The receipt printer assembly module may print a readable code on the receipt, the code linking the printed receipt to information obtained from a scanning operation carried out by the scanning module. The terminal further may comprise a code reader configured to read the printed code, to thereby access the information obtained from the scanning operation. The scanning terminal may also comprise a smart chip reader housed in the terminal base. The scanning module may be configured to scan a document having a width of up to about 225 mm and a length at least about 400 mm. The scanning terminal may further comprise control and processing electronics housed in the terminal base; a keyboard, and a display, both the keyboard and the display being electrically coupled to the control and processing electronics. The keyboard and the display may be fitted to the terminal cover.

The present invention is also a modular computer terminal, comprising a document scanner module; control and processing electronics; a display module and/or a keyboard module; and an integrated printer, wherein the modules each include quick release interlocking clips allowing the modules to be attached to or separated from one another.

According to still further embodiments, the modular computer terminal may further comprise a terminal base housing the control and processing electronics; a terminal casing removably fitted to the terminal base, the terminal casing enclosing the printer, and a terminal cover removably fitted to the terminal casing. The terminal casing may be configured to enclose a rotatably mounted cylindrical paper roll that supplies paper to the printer, flat edges of the paper roll being substantially parallel to the base surface of the terminal. The printer may be configured to print a receipt after the document scanner module scans a document, the receipt including a readable code linking the printed receipt to information associated with the scanned document. The modular computer terminal may further comprise a code reader configured to read the code, the display module displaying the information associated with the scanned document when the code reader reads the code printed on the receipt. The modular computer terminal may further comprise a random access mass storage device, the storage device storing and allowing access to the information associated with the scanned document. The integrated printer may include a read-after-print mechanism to detect scanning or printing failures. The display module may include a touch screen.

The foregoing and other features of the invention are described in detail below and set forth in the appended claims.

BRIEF DESCRIPTION OF THE DRAWINGS

For a further understanding of the objects and advantages of the present invention, reference should be made to the following detailed description, taken in conjunction with the accompanying figures, in which:

FIG. 2 is a perspective view of a document scanning terminal according to the present invention, showing the quick release interlocking clips that allow the scanner module to be readily attached to and separated from the terminal base.

DESCRIPTION OF THE PREFERRED EMBODIMENTS

Figure 1:
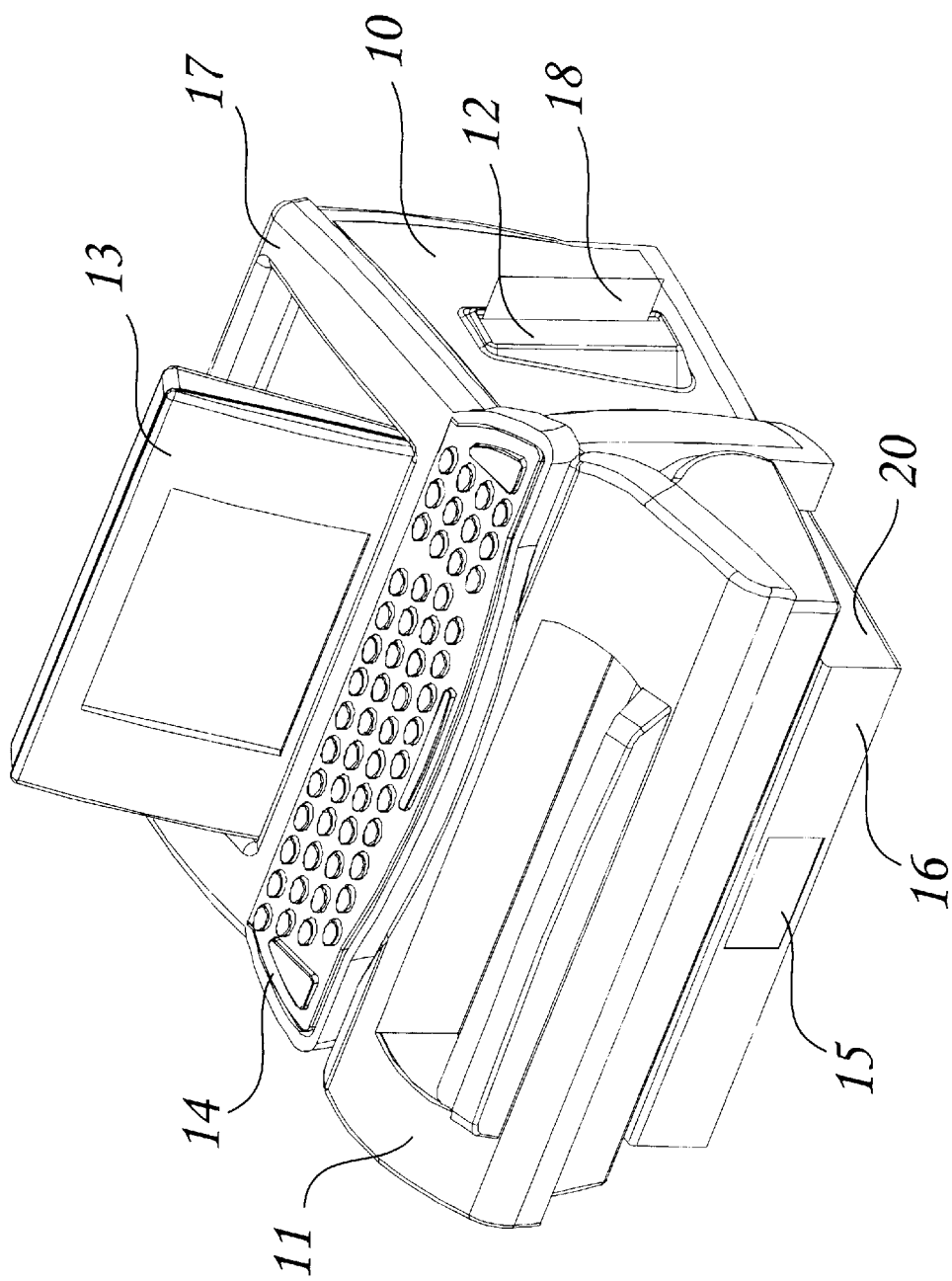
FIG. 1 is a perspective view of a document scanning computer terminal, according to an embodiment of the present invention.

The invention is a compact transactional document-scanning computer terminal that provides the means to conveniently capture an electronic image of most forms of printed documents at distributed locations, to capture all necessary process parameters or codes either automatically from the scanned document or manually by operator interactivity, to perform an electronic transaction in order to forward all the information to a remote computer or alternatively for local storage within the terminal, and to produce an electronic receipt and/or a paper receipt as a proof that the scan and store transaction has been successful and for later retrieval. According to an embodiment of the invention, the paper receipt is printed from a continuous cylindrical roll of paper contained within the terminal. Optimum compactness is achieved by placing the cylindrical paper roll centrally within the terminal with the flat sides thereof parallel to the base surface of the device (i.e., the flat edges of the paper roll are oriented horizontally when the terminal itself is disposed on a horizontal supporting surface, for example). The present compact transactional document-scanning terminal is adapted to being configured to respond to various customer specifications.

For some forms of documents, an image analysis may be immediately performed subsequent to the scan in order to extract all or part of the printed information from the document, to apply recognition algorithms to decode information, to store the decoded information and to automatically complete the transaction without further human intervention.

The invention includes a base module housing control electronics and computer processing means, and of various interlocking and removable peripherals and accessories. Transactional application software corresponding to the type of use may be loaded in the terminal and executed during or subsequent to a document scan. Such transactional application software may capture all necessary information, process parameters or codes either automatically from the scanned document or manually by operator interactivity, may perform an electronic transaction in order to forward all the information to a remote computer or alternatively for local storage within the terminal, and may produce an electronic receipt and/or a paper receipt as a proof that the scan and store transaction has been successfully carried out. The paper receipt may also be used for later retrieval of the information associated with the originally scanned document, either from local storage or from a remote storage location.

Personalization or differentiation of identical or similar terminal configurations may be simply achieved by changing the color of some of the enclosure parts or changing the shape of some simple trim parts.

The compact document-scanning terminal according to the present invention may be variously configured to respond to various customer specifications, thereby significantly lowering development time, time to market and cost. The present configurable scanning terminal may advantageously be used for transactional document scanning applications in a variety of fields, including banking, finance, legal, accounting, administration, insurance, healthcare, post office, gaming, police, security, retail, education, and transport, for example.

FIG. 1 is a perspective view of a scanning terminal (or scanning computer terminal) according to the present invention. The transactional document-scanning terminal of FIG. 1 may include a casing 10, a document scanner module 11, a receipt printer assembly 19 (shown in more detail, for example, in FIG. 4) of which only the receipt exit guide 12 is visible in FIG. 1, a display module 13, a keyboard module 14, a code reader 15, a rigid terminal base 20 that encloses an accessory bay 16 and a cover 17. In the embodiment illustrated in FIG. 1, the printed receipt 18 is delivered vertically to the side of the terminal through the receipt exit guide 12.

Figure 12:
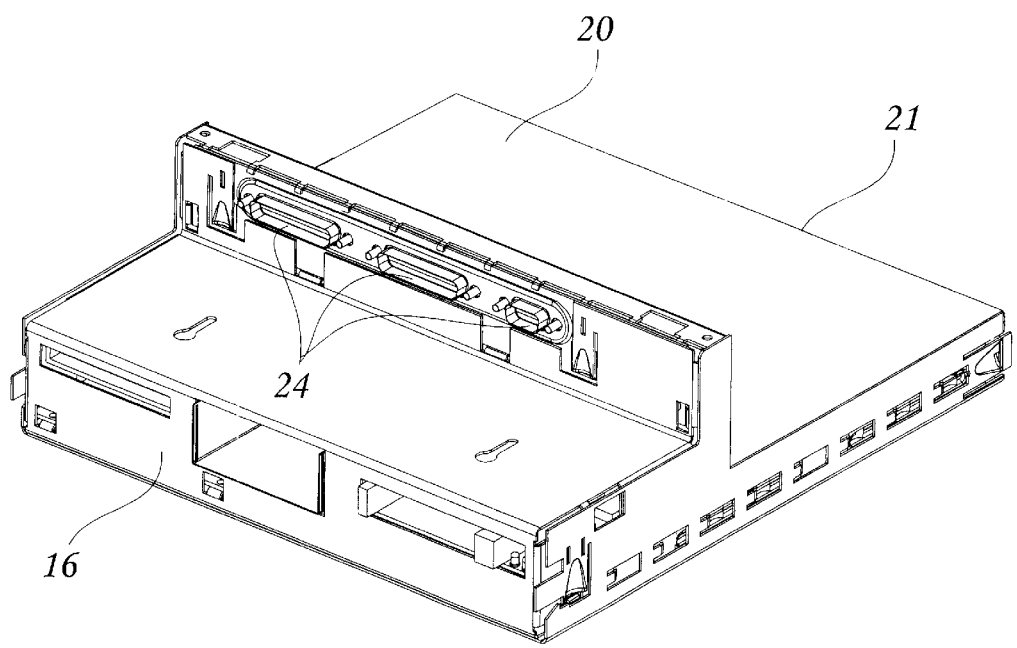
FIG. 12 shows a perspective view of the terminal base of the scanning terminal of the present invention, enlarged to show detail.

FIG. 2 is a perspective view of a scanning terminal according to the present invention, showing the quick release interlocking clips 24 that allow the scanner module 11 to be readily attached to and separated from the terminal base 20. The rigid terminal base 20 supports all of the modules enumerated above and houses the control electronics. FIG. 12 shows an enlarged view of the terminal base 20, according to another embodiment of the present invention. The scanner module 11 may be quickly separated from the terminal base 20 by acting on the quick release interlocking clips 24. The scanner module 11 may be electrically connected to the control electronics (shown in FIG. 13) contained in the terminal base 20 via heavy-duty connectors 23 that mate with corresponding connectors located at the rear (hidden from view in the perspective representation of FIG. 2) of the scanner module 11. The scanner module 11 may be fitted with a contact image sensor 216 mm in width, for example, thereby allowing it to scan letter size documents. In fact, such an embodiment of the scanner module according to the present invention may accept paper widths up to 225 mm and paper lengths in excess of 400 mm, but the electronic image that is produced is limited in width to 216 mm, the width of the contact image sensor of the scanner module 11. Other contact image sensors widths may also be fitted to the compact scanner according to the present invention with appropriate scaling of the scanner dimensions.

The scanner module 11, when detached from the terminal base 20 of the document-scanning terminal according to the present invention, is also operable as a standalone scanner peripheral that is independently operable when connected to a computer (such as a personal computer, hereafter "PC") via a parallel port. This approach offers considerable advantages for manufacturing cost, maintenance and upgrade.

Figure 3:
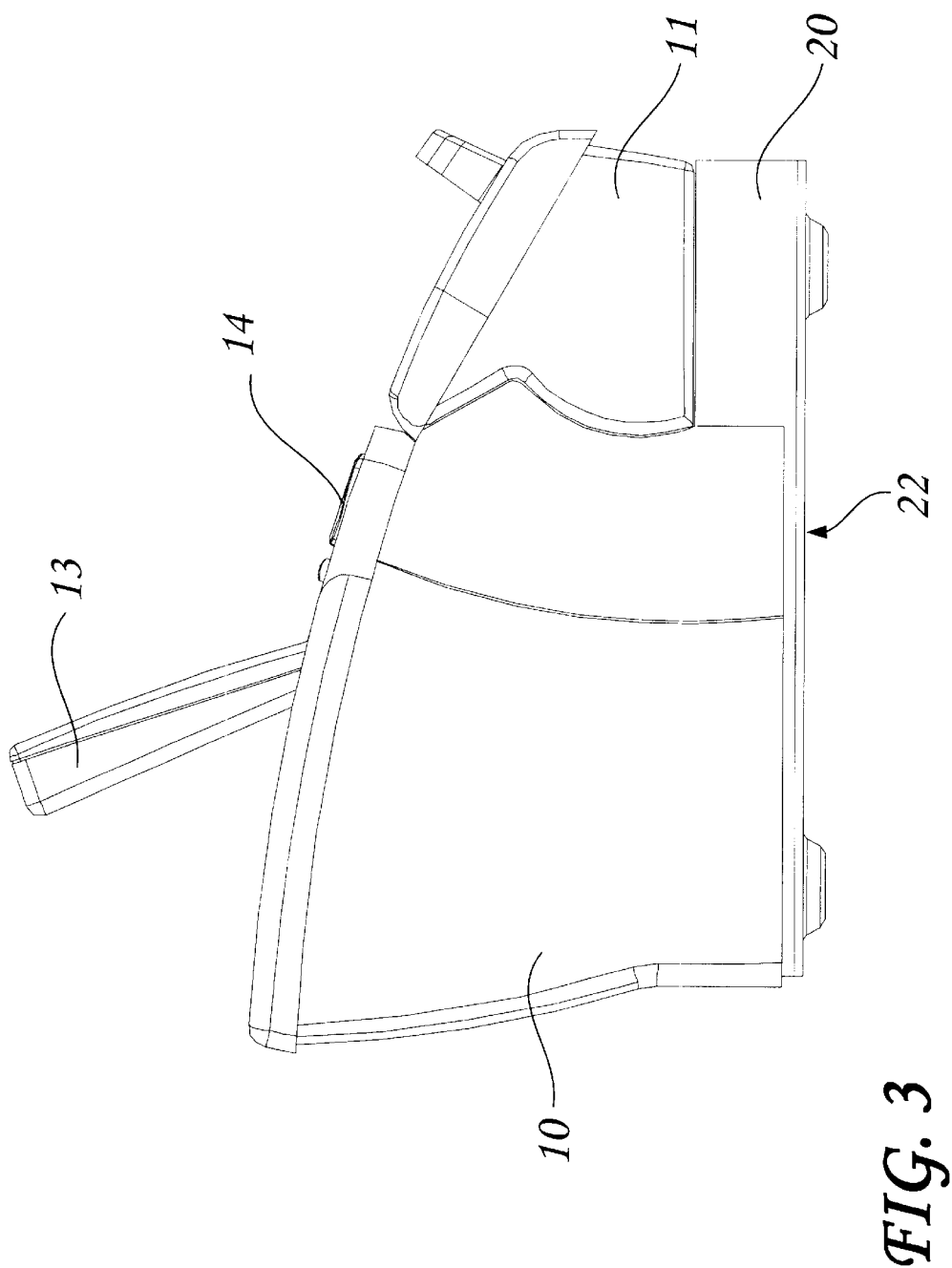
FIG. 3 is a side view of the document-scanning terminal according to the present invention, showing the scanner module affixed to the rigid terminal base.

FIG. 3 is a side view of the transactional document-scanning terminal according to the present invention, showing the scanner module 11 relative to the rigid terminal base 20. The document scanner module 11 may be advantageously placed on the terminal base 20 at the front of the terminal to facilitate the operation, maintenance and upgrade thereof. Indeed, scanner modules 11 having many different characteristics may be fitted to the terminal base 20. Such characteristics may include, for example, differing image resolutions (such as 100 dpi, 160 dpi, 300 dpi, 400 dpi, 600 dpi or other resolutions), different scan feed speeds, black and while, gray shade, color, different blind colors, different light sources and image sensors for special security inks, different paper path for handling light paper or rigid paper, full duplex both side scanning, non-optical scanners such as inductive and capacitive scanning of conductive inks, rigid identity (ID) card scanner, flat bed scanner and/or a combination of the various options listed above. For example, should the document scanner module 11 be used to scan rigid ID cards, the module 11 may incorporate the functionality and/or structure disclosed (and/or claimed) in commonly assigned U.S. patent application Ser. No. 08/902,872 entitled "ID Card Image Reader" filed on Jul. 30, 1997, the disclosure of which is incorporated in its entirety. Alternatively, should the document scanner module 11 be used to scan documents including conductive ink features, the module 11 may incorporate the functionality and/or structure disclosed (and/or claimed) in commonly assigned U.S. patent application Ser. No. 09/076,666 entitled "Scratchable Conductive Latex Document Scanner" filed on May 12, 1998, the disclosure of which is also incorporated herewith in its entirety. The document scanning module may be equipped with an automatic document feeding mechanism. To insure that documents are fed to the module automatically when presented thereto and are fed therein without performance degrading skew, the scanning module 11 may incorporate the functionality and/or structure disclosed (and/or claimed) in commonly assigned U.S. patent application Ser. No. 09/904,337 entitled "Anti-Skew Auto-Start System for Document Scanners" and filed on Jul. 31, 1997, the disclosure of which is also incorporated herewith in its entirety.

Figure 4:
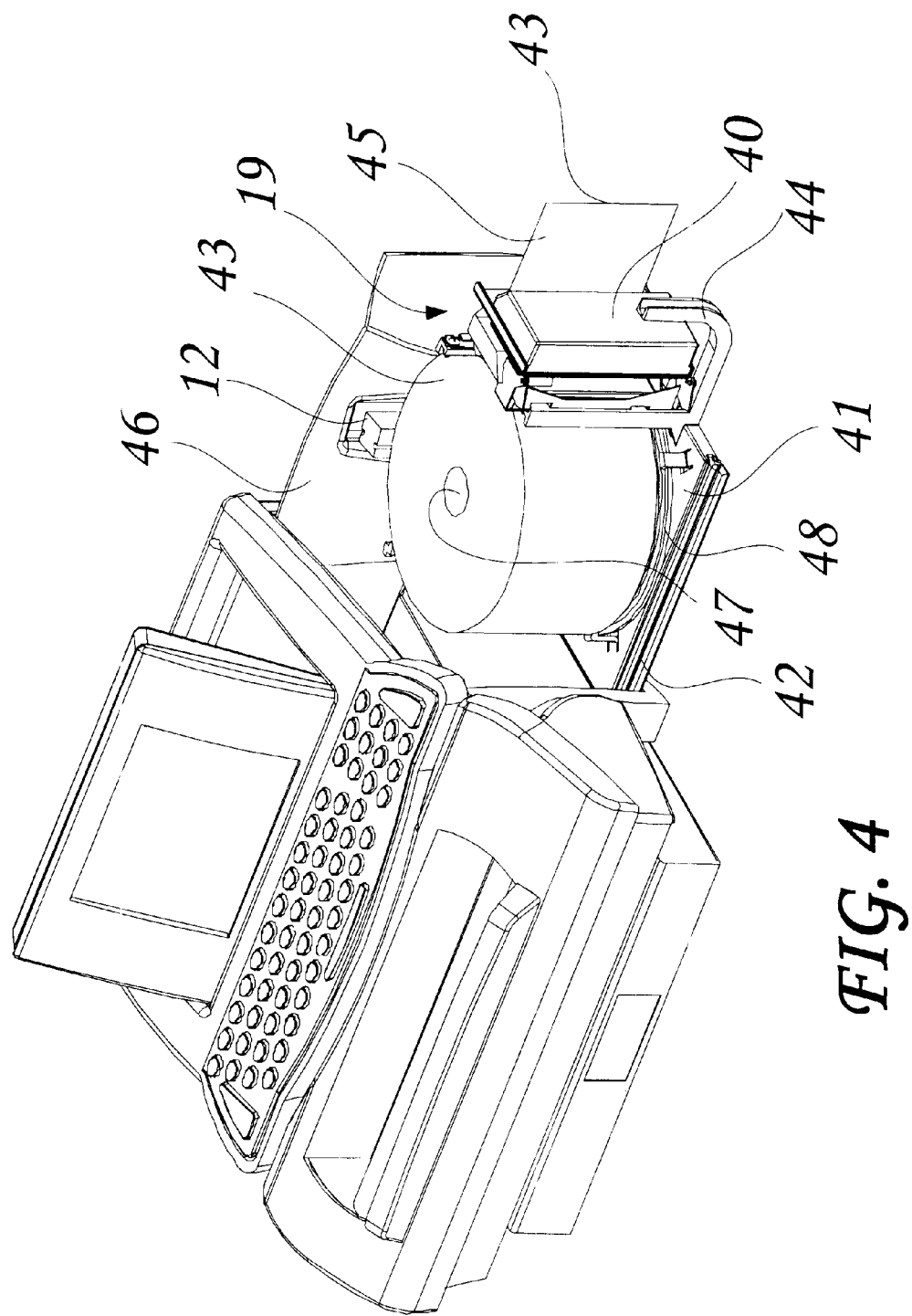
FIG. 4 is a perspective view of the scanning terminal according to an embodiment of the present invention, showing details of the receipt printer assembly.

FIG. 4 is a perspective view of the scanning computer terminal of the present invention, showing details of the receipt printer assembly 19. In the embodiment shown in FIG. 4, the receipt printer assembly 19 is integrated within the scanning computer terminal. Moreover, the receipt printer assembly 19 is configured such that a large cylindrical paper roll 43 is placed in a position that provides the most overall compact size. In FIG. 4, the receipt printer assembly 19 is shown in the paper loading and servicing state, wherein a sliding tray 41 that supports the paper roll 43 and the assembly 19 is fully extended. The cylindrical paper roll 43 and a printer mechanism 40 are secured on the tray 41 that slides in and out of the terminal, constrained by sliding guides 42. The pivoting door 46 may be closed when the receipt printer is pushed back fully inside the scanning terminal, as shown in FIGS. 1–3. The free end 45 of the paper roll 43 is guided out of the scanning terminal by the receipt exit guide 12 that may be located on the door 46. According to further embodiments of the present invention, the sliding tray 41 may be configured such that the paper loading and servicing may be performed from the other side of the terminal or from the rear thereof.

The cylindrical paper roll 43 is preferably placed on the sliding tray 41 such the two flat edges of the cylindrical roll 43 lie substantially parallel to the facing surface of the sliding tray 41 and/or substantially parallel to the base surface 22 (shown in FIG. 3) of the terminal. The base surface 22 of the terminal is that surface closest to and parallel to the surface supporting the scanning computer terminal.

Figure 14:
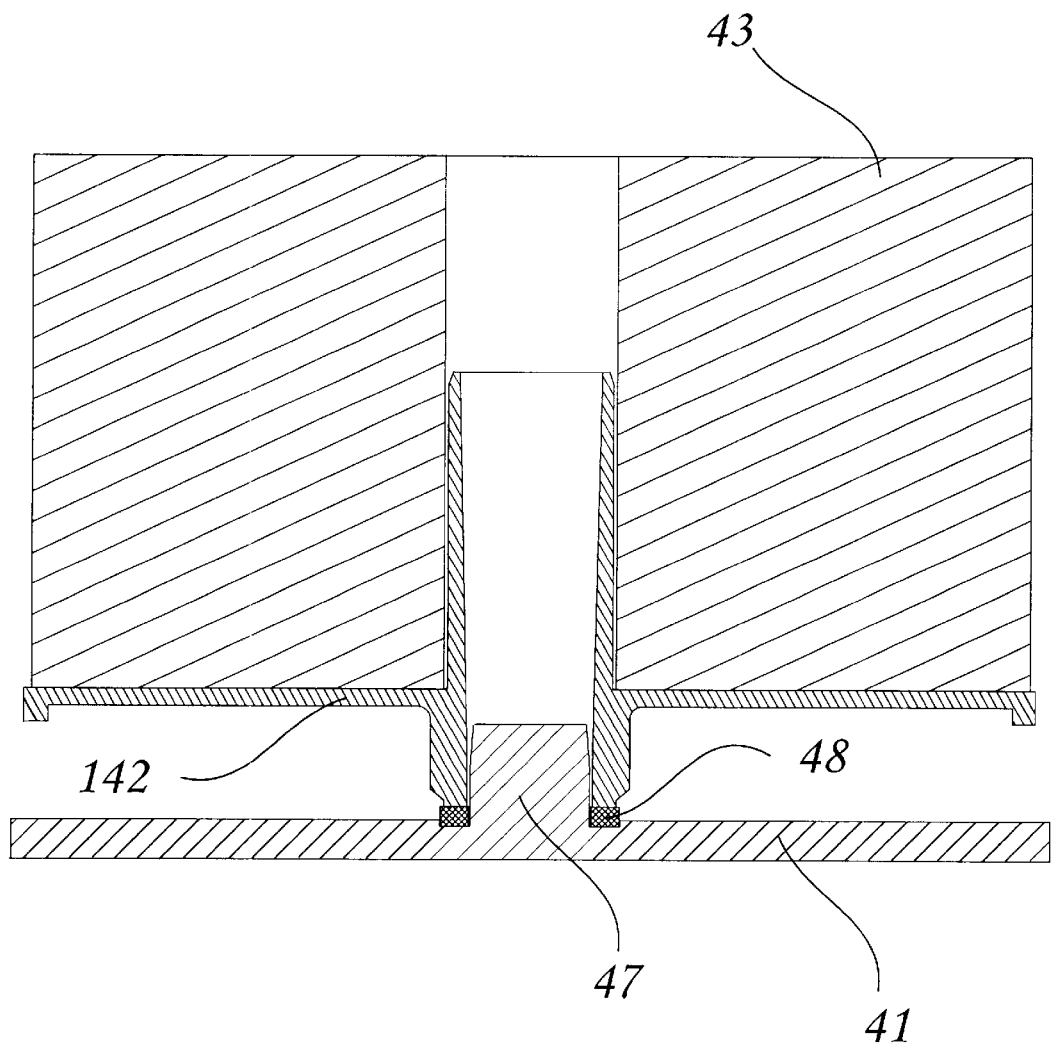
FIG. 14 is a cross section showing the manner in which the paper roll may be placed on the sliding tray, according to an embodiment of the present invention.

FIG. 14 is a cross section showing how the paper roll is placed on the sliding tray 41. The paper roll 43 is placed on a rotating platter 142 that rotates freely around the spindle 47. In order to deliver a smooth rotation for the heavy paper roll that could weight several kilograms, a circular thrust bearing 48 is used between the sliding tray 41 and the rotating platter 142. Dry and self-lubricating thrust bearings made of high performance polymer such as IGLIDUR from IGUS GmbH of Germany are particularly well suited for this use, and the large quantity of paper dust generated during the life of the printer does not affect the quality of the smoothness of the rotation. Balls or rollers thrust bearings will become contaminated by fine paper dust resulting in stickiness that would affect the smoothness of the paper platter rotation. The life of the trust bearing 48 is preferably in access of 8 years.

A handle 44 may be used to pull out and push in the receipt printer assembly 19 from the casing 10 on the sliding tray 41 guided by the sliding guides 42. A stopper mechanism may be provided to prevent the sliding tray 41 from being pulled out too far. A stabilizing mechanism may also be provided to prevent the terminal from tilting due to the torque applied by the weight of the paper roll 43 and the tray 41 when the sliding tray 41 is in its fully extended position (as shown in FIG. 4).

The printer mechanism 40 of the receipt printer assembly 19 may be advantageously equipped with an automatic paper cutting mechanism that cleanly cuts the paper from the paper roll 43 and frees the paper when the printing of the receipt is completed. The printer mechanism 40 may be of the thermal print type, impact type, electric burning or arcing type, ink jet type or any other compact printing technology. A suitable thermal printer mechanism with an auto-cutter feature is the Epson model M-T301. Advantageously, the printer mechanism 40 may also be fitted with a read-after-print mechanism in order to detect print anomalies or scanning or printing failures. Suitable read-after-print mechanisms include mechanisms of the bar-code reader type, contact image sensor type or any other compact imaging technology. The scanning terminal according to the present invention may be configured with an internal receipt printer assembly, as shown at reference 19, with an external receipt printer, or without any receipt printer assembly at all.

Figure 5:
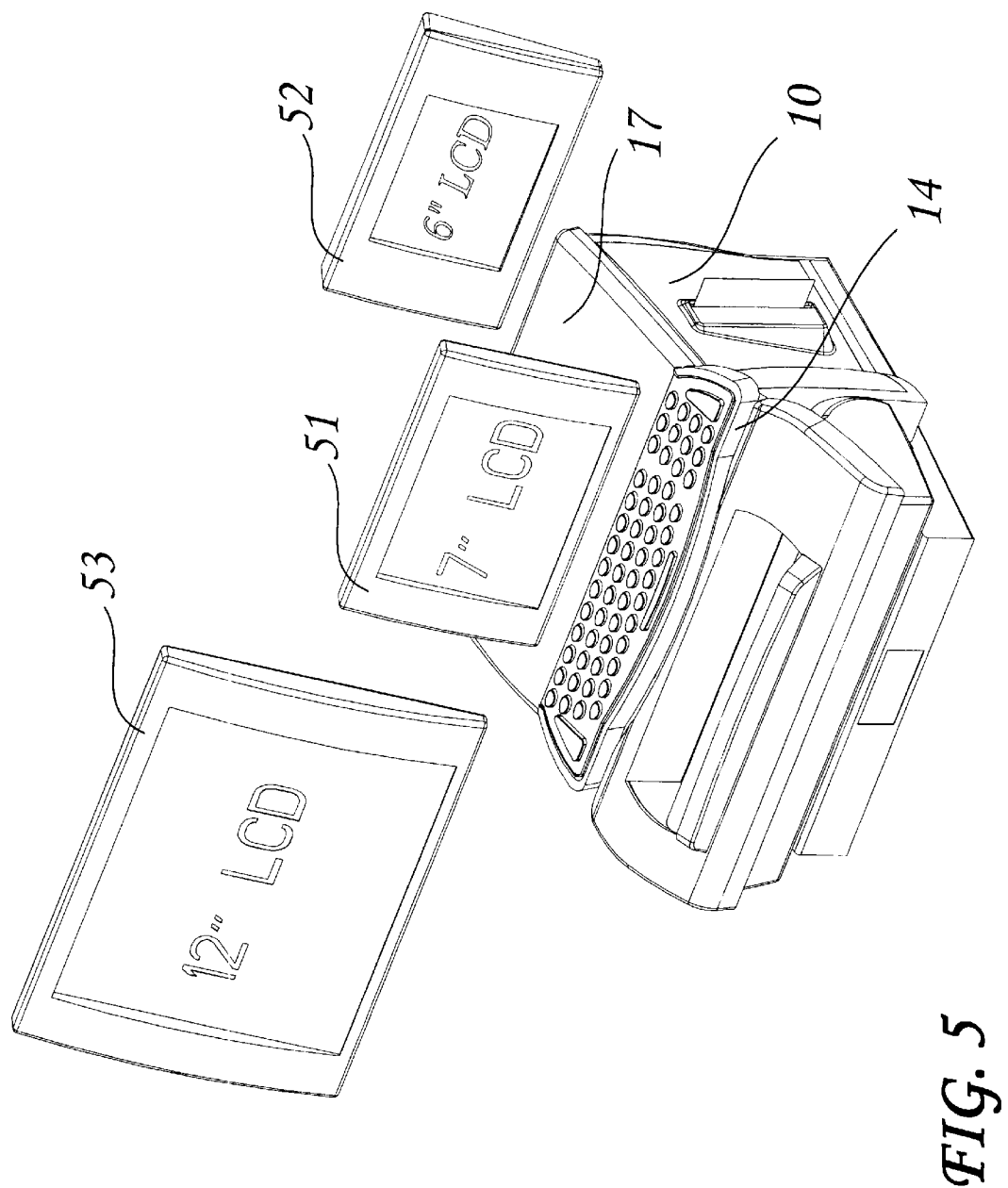
FIG. 5 is a perspective view of the scanning terminal according to an embodiment of the present invention, showing various possible sizes of displays that may be fitted thereto.

FIG. 5 is a perspective view of the scanning computer terminal of the present invention, showing examples of various sizes of displays that may be fitted thereto. Indeed, the present scanning terminal may accommodate displays such as a 7-inch Liquid Crystal Display (LCD) 51, a 6-inch LCD 52 or a 12-inch LCD 53, for example. The displays 51, 52 or 53 may be color or monochrome graphics displays, may employ LCD or plasma technologies or any lightweight flat panel technology. Alternatively, the present scanning terminal may also be fitted with simpler and more economical displays such as line displays, simple status indicators (such as Light Emitting Diodes - LED) or no display at all.

The casing 10 may be covered by a replaceable cover 17 that is fixed by quick release interlocking clips. The cover 17 supports a display 51, 52, 53 and the keyboard module 14. Different configurations of the cover 17 may accommodate displays 51, 52, 53 of different sizes. The electrical contacts to carry the electrical signals and power between display 51, 52, 53 and the control electronics (shown in FIG. 13), and between the keyboard module 14 and the control electronics may be established via integrated connectors that do not require manual handling. Selection of display type or later upgrade may, therefore, be simply carried out by changing the cover 17 and the display 51, 52, 53.

Figure 6:
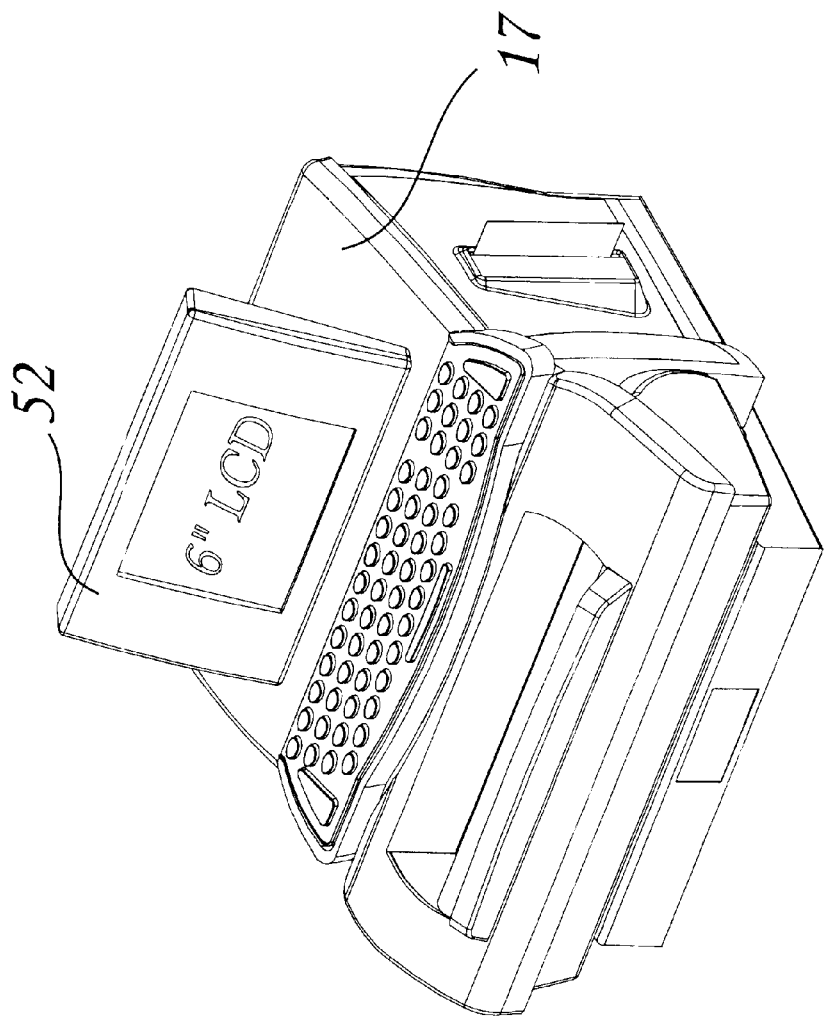
FIG. 6 is a perspective view of the scanning terminal according to an embodiment of the present invention, showing the scanning terminal fitted with a 6-inch display.
Figure 7:
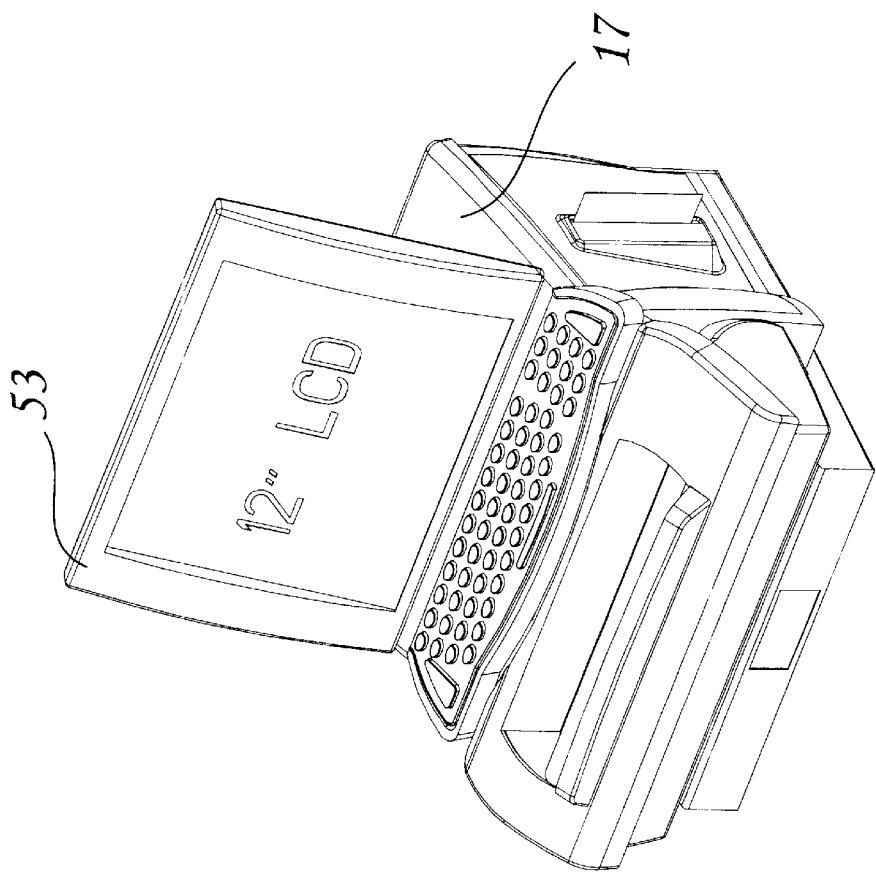
FIG. 7 is a perspective view of the scanning terminal according to an embodiment of the present invention, showing the scanning terminal fitted with a 12-inch display.

The display 51, 52, 53 may be tilted a various angles, using a retaining mechanism such as friction hinges, spring click locking, pin locking or hand tightening knob. According to a further embodiment of the present invention, the display 51, 52, 53 may be advantageously fitted with a touch screen to enable manual user interaction. In that case, a stabilizing mechanism is preferably added to avoid the display tilting back when manual pressure is applied to the touch panel. The terminal, when including a touch screen, may omit the keyboard module 14. Alternatively, the terminal of the present invention may include both a keyboard module 14 and a touch screen display. FIG. 6 is a perspective view showing the scanning terminal fitted with a 6-inch display 52 and an appropriately dimensioned cover 17, whereas FIG. 7 is a perspective view showing the scanning terminal fitted with a 12-inch display 53 and an appropriately dimensioned cover 17.

Figure 8:
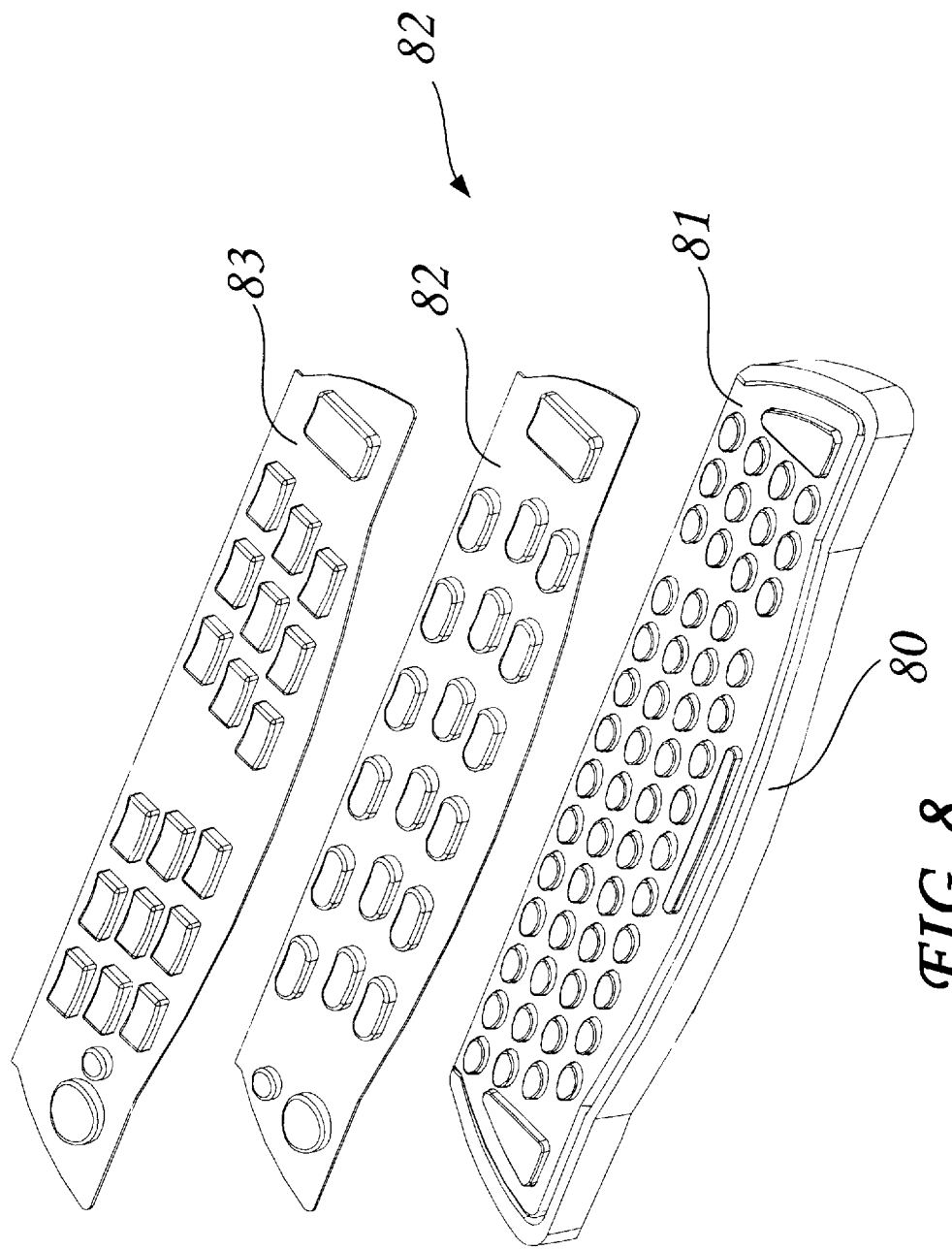
FIG. 8 is a perspective view of several embodiments of the keyboard module of the scanning terminal according to the present invention, showing several alternative key layouts.

FIG. 8 is a perspective view of several embodiments of the keyboard module 14, including several alternative key layouts. The keyboard module 14 is fixed to the cover 17 of the terminal by quick release interlocking clips of the type shown, for example, at reference numeral 24 in FIG. 2. Various keyboard configurations may, therefore, be fitted to the terminal by simply changing the color and/or keypad layout such as shown at reference numerals 81, 82 and 83. The keyboard modules 14, 81, 82 and 83 allow a flexible means for the user to interact with the terminal. As the keyboard module 14, 81, 82 or 83 may be attached to the terminal cover 17, various configurations and/or combinations of keyboard module 14, 81, 82 and 83 and the display module 13, 51, 52 or 53 may be implemented by simply replacing the cover 17, the keyboard module 14, 81, 82 and 83 and the display module 13, 51, 52, 53, without affecting the rest of the terminal. This flexibility is particularly advantageous when customizing or upgrading the terminal.

Figure 9:
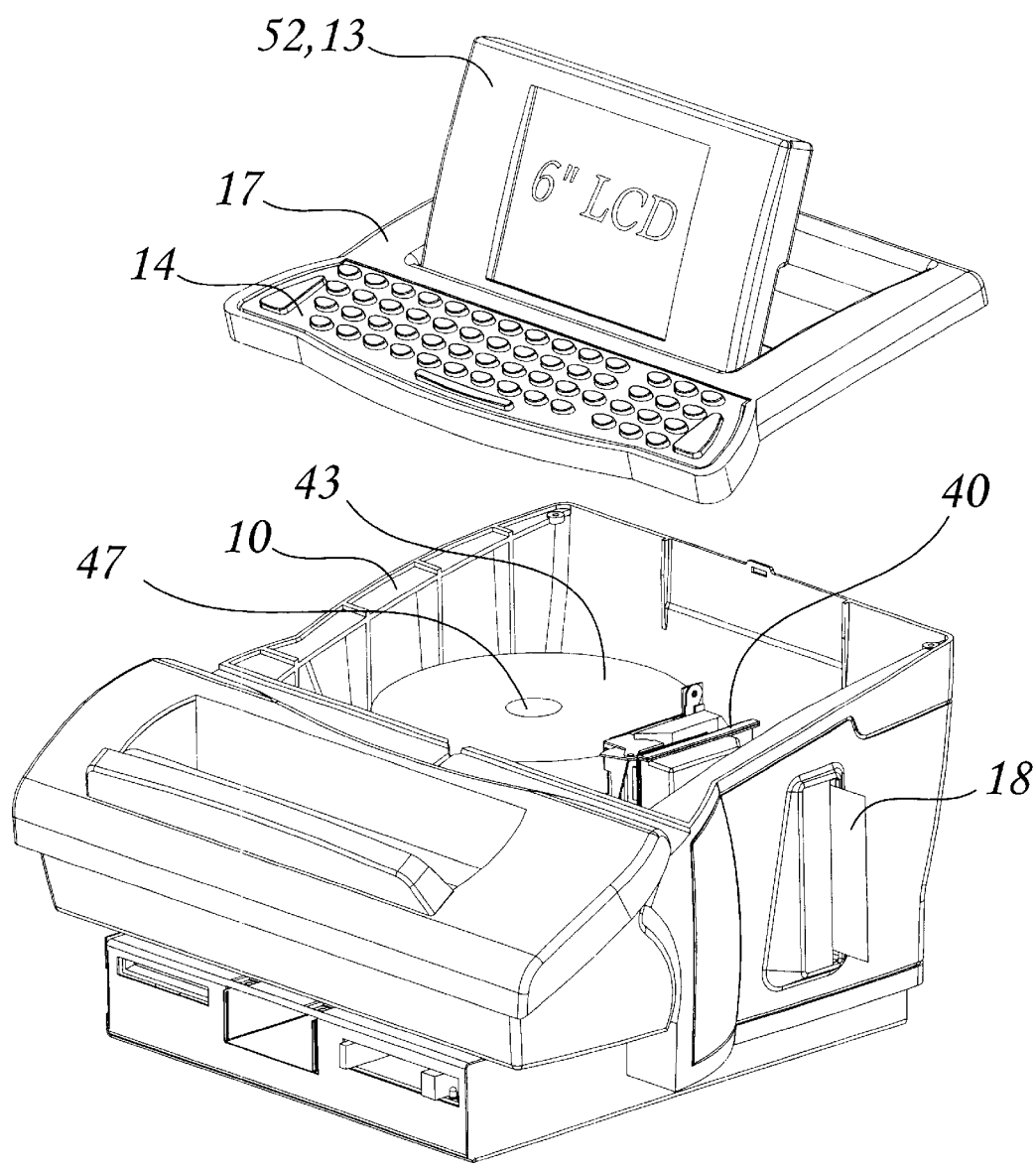
FIG. 9 is a perspective view of the scanning computer terminal according to an embodiment of the present invention, showing the terminal with the cover thereof removed.
Figure 11:
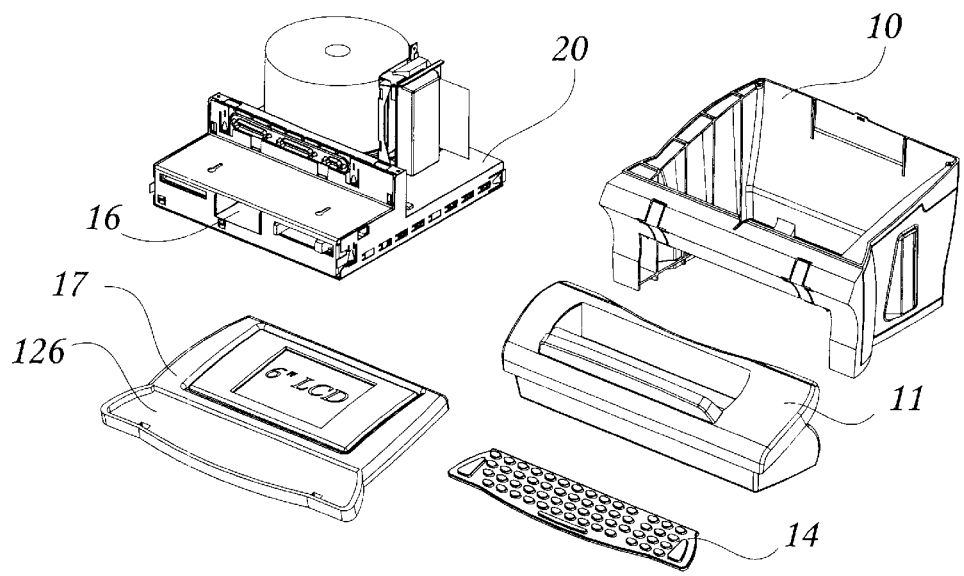
FIG. 11 is a perspective view of the scanning computer terminal according to an embodiment of the present invention, in a disassembled state.

FIG. 9 is a perspective view showing the terminal with the cover 17 removed. The cover 17 of the terminal may be quickly and easily separated and removed from the casing 10 by releasing quick release interlocking clips. The cylindrical paper roll 43, according to the embodiment shown in FIG. 9, is positioned horizontally and centrally within the casing 10 to offer optimum compactness. The printer mechanism 40 of the assembly 19 is placed close to one side of the casing 10 and prints the receipt 18. The scanning terminal and hence the printer mechanism 40 may be configured such that the receipt 18 is retrieved from either side or from the rear of the terminal of the present invention. The paper roll 43 may be mounted onto a sliding tray 41, as shown in FIG. 4. Alternatively, the paper roll 43 and/or the receipt printer assembly 19 may be mounted to the terminal base 20 (as also shown in FIG. 11). In that case, the loading of the cylindrical roll 43 may be carried out by removing the cover 17 as shown in FIG. 9 (and/or the casing 10 as shown in FIG. 11) and dropping the roll 43 onto the spindle 47.

Figure 10:
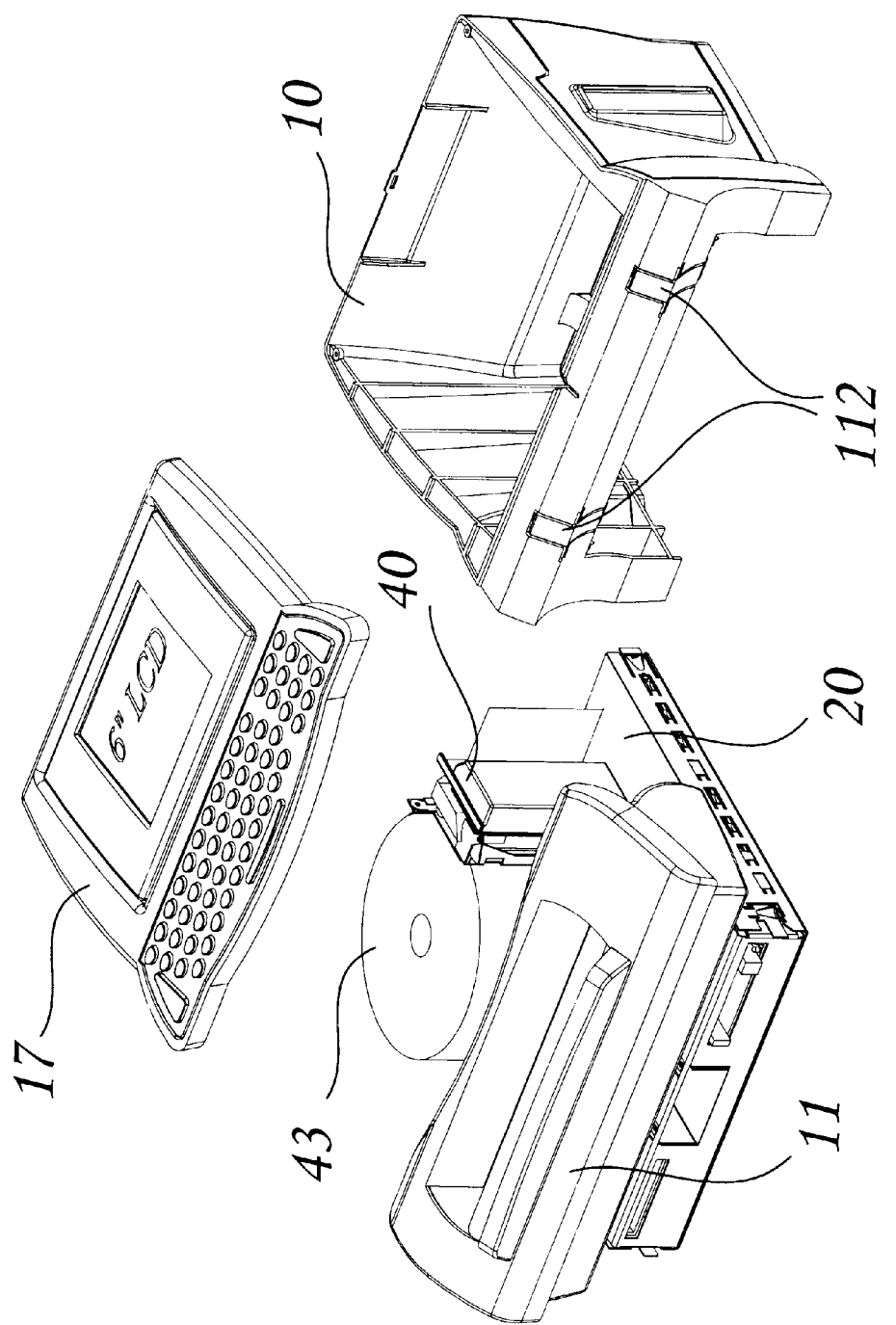
FIG. 10 is a perspective view of the scanning computer terminal showing the casing removed.

FIG. 10 is a perspective view of the scanning terminal showing the casing 10 removed. The casing 10 may be separated from the terminal base 20 by releasing quick release interlocking clips 112. The scanner module 11, the paper roll 43 and the printer mechanism 40 may remain in place when the casing 10 is removed.

FIG. 11 is a perspective view showing the scanning terminal according to the present invention in a partially disassembled state. The terminal may be constructed according to various customer requirements by simply selecting the appropriate modules that may be attached to the base 20 and the casing 10; that is, the type of scanner module 11, the cover 17 corresponding to the display 13, the keyboard module 14, the keyboard tray 126, the layout of the keyboard module 14, the type of receipt printer assembly 19 and the accessories to be fitted in the accessory bay 16 of the terminal base 20. As alluded in the description associated with FIG. 9, the cylindrical paper roll 43 and/or the receipt printer assembly 19 may be mounted to the terminal base 20, rather than on a sliding tray 41. In that case, removal of the cover 17 and/or the casing 10 as shown in FIG. 11 allows unencumbered access to both the cylindrical paper roll 43 and the receipt printer assembly 19 for paper loading and/or servicing purposes.

FIG. 12 is a perspective view of the terminal base 20, enlarged to show detail. The terminal base 20 is rigidly constructed to support all the accessories fitted in the accessories bay 16, and all the modules shown in FIG. 11. The base 20 further encloses all the control and processing electronics detailed in FIG. 13.

Figure 13:
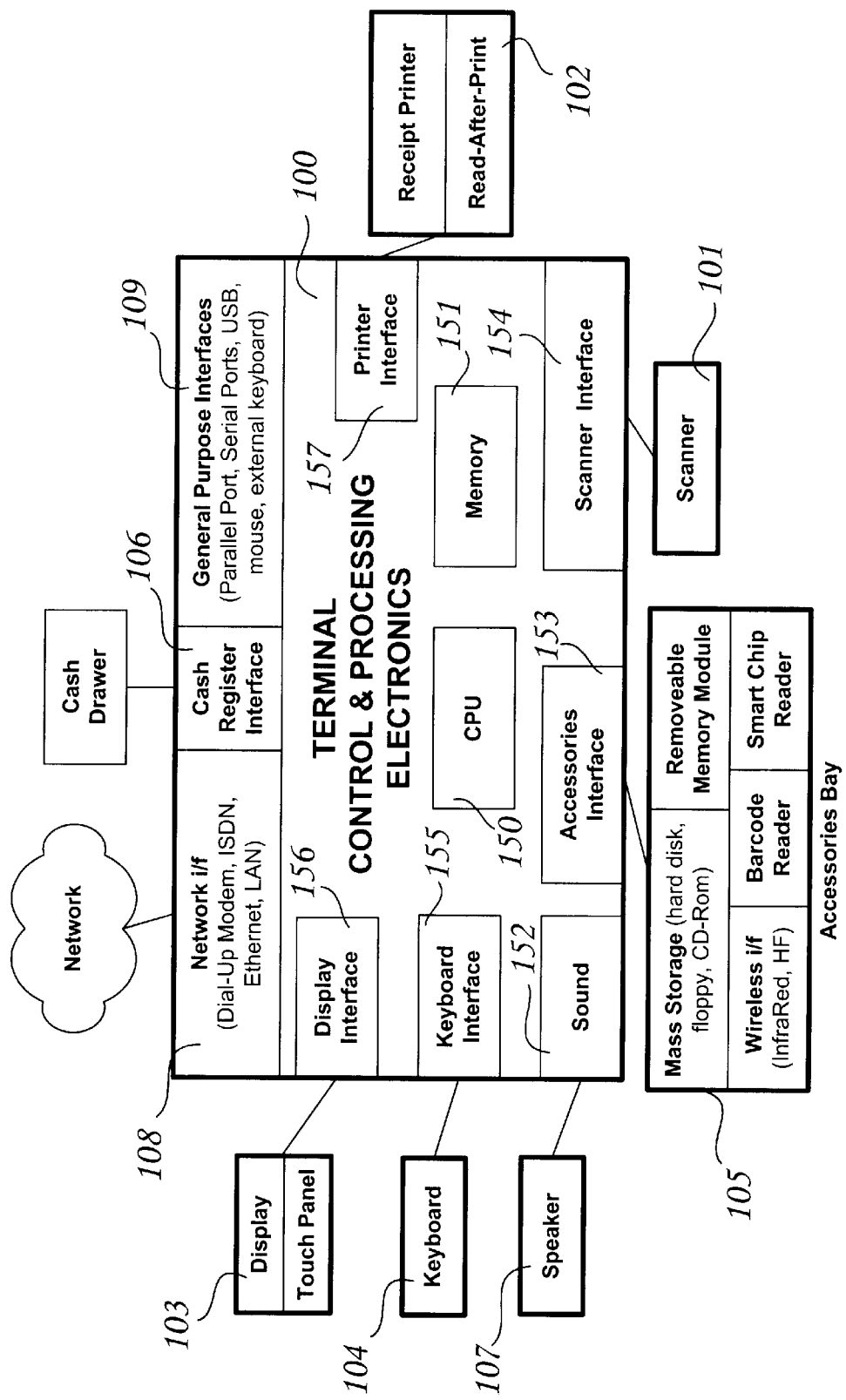
FIG. 13 is a block diagram of the terminal control electronics of the scanning terminal of the present invention.

FIG. 13 is a block diagram of the control and processing electronics 100 of the present scanning computer terminal, according to an embodiment of the present invention. The terminal control and processing electronics 100 comprises an embedded CPU 150 and memory 151 for executing the operating system software, the interfaces and peripherals control software, and the application software. The control electronics depicted in FIG. 13 may implement a general-purpose computer terminal with document scanning capabilities, or may implement a document-scanning terminal with processing abilities. The various peripherals that may be controlled by the control electronics include, for example, the document scanner module 11 via the scanner interface 154, the receipt printer assembly 19 via the printer interface 157 (the printer assembly 19 may be fitted with a read-after-print option 102), the display 13 via the display interface 156 (the display 13 may be fitted with a touch panel for user interactivity) and/or a keyboard 14 via the keyboard interface 155. The accessories bay 16 of the terminal base 20 may be fitted with various accessories 105 including, for example, a barcode reader such as a laser barcode reader or a Charge Coupled Device (CCD) barcode reader, random access mass storage devices such as hard disk, floppy disk reader, CD-or DVD-ROM reader, removable memory module such as PCMCIA flash card, a smart chip reader such as a smart card reader or a smart key reader, and/or a wireless interface such as an infrared or high frequency (HF) interface, each of which may be controlled by an appropriate interface (collectively represented in FIG. 13 by the accessories interface 153). The scanning terminal control electronics may also include a cash register interface 106 for controlling a cash drawer 158, a speaker 107 coupled to a sound interface 152 and a network interface 108 for communicating with a network 159 such as dial-up modem, ISDN, xDSL, Ethernet or local area network for example, and general purpose interfaces 109 for communicating with devices fitted with standard interfaces such a parallel ports, serial ports, USB ports, mouse ports, keyboard ports, etc. The interfaces 108, 106 and 109 may be accessible at the rear 21 (shown in FIG. 12) of the base 20 of the scanning terminal according to the present invention. For example, the control electronics 100 may include the functionality and/or structure disclosed and/or claimed in commonly assigned U.S. patent application Ser. No. 08/931,131 entitled "Universal Document Scanner Controller" filed on Sep. 16, 1997, the disclosure of which is incorporated herewith in its entirety. The power requirements of the scanning terminal according to the present invention may advantageously be met by a scanner power module, as disclosed and/or claimed in commonly assigned U.S. Pat. No. 5,847,948 entitled "Scanner Power Module" and filed on Jul. 30, 1997, the disclosure of which is also incorporated herein by reference in its entirety. Such a scanner power module may readily be housed in the accessory bay 16 of the terminal base 20.

The modular transactional scanning terminal described herein offers a very compact, high performance, heavy duty solution for scanning large size documents and is capable of addressing the needs of a wide variety of transactional document scanning applications in fields such as banking, finance, legal, accounting, administration, insurance, healthcare, post office, gaming, police, security, retail, education or transportation, for example.

Professional document scanners such as the compact modular transactional scanning terminal presented are not mass produced products, and therefore, modularity and flexible configuration from a base product are extremely important attributes in order to meet customer requirements and personalization at a low price. Moreover, the scanning module 11 presented herein may also function as a standalone scanner peripheral when connected to a standard personal computer via a parallel port; this approach offers considerable advantages for manufacturing cost, maintenance and upgrade.

While the foregoing detailed description has described preferred embodiments of the present invention, it is to be understood that the above description is illustrative only and not limiting of the disclosed invention. For example, other receipt printer configurations may occur to those of skill in this art. Still other modifications may occur to those of skill in this art. Thus, the present invention to be limited only by the claims as set forth below.

What is claimed is:

1. A terminal, comprising:
   a display module;
   a document scanning module;
   a cylindrical paper roll rotatably mounted on a spindle within the terminal such that flat edges of the roll are substantially parallel to a base surface of the terminal;
   a receipt printer assembly, the receipt printer assembly being adapted to print a receipt of a document scanning operation on paper from the cylindrical paper roll, and
   control and processing electronics, the control and processing electronics being coupled to and controlling an operation of at least the display module, the document scanning module and the receipt printer assembly.

2. The terminal of claim 1, further comprising a sliding tray supporting the receipt printer assembly and the cylindrical paper roll, the tray being adapted to slide from a first position wherein the paper roll and the receipt printer assembly are disposed within the terminal and a second position wherein both the receipt printer assembly and the paper roll are exposed to allow substantially unencumbered access thereto.

3. The terminal of claim 2, further including a handle attached to the sliding tray for manually pushing and pulling the sliding tray into and out of the terminal.

4. The terminal of claim 2, wherein the sliding tray is travel-limited to prevent the sliding tray from being pulled out too far and tipping the terminal.

5. The terminal of claim 2, further comprising:
   a pivoting terminal door; and
   a paper exit guide mounted within the pivoting terminal door, the printed receipt being fed through the paper exit guide.

6. The terminal of claim 1, wherein the receipt printer assembly prints a readable code on the receipt linking the printed receipt to information obtained from the document scanning operation and wherein the terminal further comprises a code reader configured to read the printed code, to thereby access the information obtained from the document scanning operation.

7. The terminal of claim 1, wherein the code reader includes a barcode reader.

8. The terminal of claim 7, wherein the barcode reader includes one of a laser barcode reader and a CCD bar code reader.

9. The terminal of claim 1, wherein the receipt printer assembly includes a read-after-print mechanism to detect printing failures.

10. The terminal of claim 1, further comprising a communications interface adapted to allow the terminal to communicate with a remote computer.

11. The terminal of claim 1, further comprising a smart chip reader coupled to and controlled by the control and processing electronics.

12. The terminal of claim 1, further including at least one of a keyboard module and a touch screen coupled to the control and processing electronics.

13. The terminal of claim 1, wherein at least the display and document scanning modules include quick release interlocking clips that allow the modules to be attached to or separated from one another and/or a terminal base.

14. The terminal of claim 1, further including a cover to which the display module is fitted, the cover being dimensioned to a size of the display module.

15. The terminal of claim 1, wherein the receipt printer assembly includes a printer of a type selected from a group including thermal print, impact, electric burning and arcing and inkjet types.

16. A document scanning terminal, comprising:
    a scanning module;
    a receipt printer assembly module adapted to print a receipt of a scanning operation from paper fed to the printer assembly by a cylindrical paper roll, the cylindrical paper roll being disposed within the terminal such that flat edges of the roll are substantially parallel to a base surface of the terminal.

17. The scanning terminal of claim 16, wherein the receipt printer prints a readable code on the receipt that links the printed receipt to information obtained from a scanning operation carried out by the scanning module and wherein the terminal further comprises a code reader adapted to read the code, to thereby access the information obtained from the scanning operation.

18. The scanning terminal of claim 16, further comprising:
    a terminal base;
    a terminal casing removably fitted to the terminal base, the terminal casing enclosing the receipt printer assembly, and
    a terminal cover removably fitted on the terminal casing.

19. The scanning terminal of claim 18, further comprising a sliding tray mounted to the terminal base, the sliding tray supporting the receipt printer assembly and the cylindrical paper roll, the tray being adapted to slide from a first operative position wherein the paper roll and the receipt printer assembly are enclosed within the terminal casing and a second paper loading and servicing position wherein both the receipt printer assembly and the paper roll are accessible outside the terminal casing.

20. The scanning terminal of claim 19, wherein the terminal casing comprises a pivoting door, the door being open when the tray is in the second position.

21. The scanning terminal of claim 18, wherein the receipt printer assembly and the cylindrical paper roll are mounted to the terminal base and the cylindrical roll of paper is loaded by detaching the terminal cover from the terminal casing and/or removing the terminal casing from the terminal base.

22. The scanning terminal of claim 18, wherein the scanning module, the terminal base, the terminal casing and the terminal cover each include quick release interlocking clips allowing the scanning module, the terminal base, the terminal casing and the terminal modules to be attached to or separated from one another.

23. The scanning terminal of claim 18, further comprising control and processing electronics housed in the terminal base, the terminal base and the scanning module including mating integrated power and control connectors to electrically couple the scanning module to the control and processing electronics.

24. The scanning terminal of claim 16, wherein the receipt printer assembly module prints a readable code on the receipt that links the printed receipt to information obtained from a scanning operation carried out by the scanning module and wherein the terminal further comprises a code reader configured to read the printed code, to thereby access the information obtained from the scanning operation.

25. The scanning terminal of claim 18, further comprising a smart chip reader housed in the terminal base.

26. The scanning terminal of claim 16, wherein the scanning module is configured to scan a document having a width of up to about 225 mm and a length at least about 400 mm.

27. The scanning terminal of claim 18, further comprising:

control and processing electronics housed in the terminal base;

at least one of a keyboard and a display, the keyboard and the display being electrically coupled to the control and processing electronics.

28. The scanning terminal of claim 27, wherein the keyboard and the display are fitted to the terminal cover.

29. The scanning terminal of claim 27, wherein the display includes a touch screen.

30. A modular computer terminal, comprising:

a document scanner module;

control and processing electronics;

a display module;

a keyboard module;

an integrated printer;

a terminal base housing the control and processing electronics;

a terminal casing removably fitted to the terminal base, the terminal casing enclosing the printer, wherein the modules each include quick release interlocking clips allowing the modules to be attached to or separated from one another, and wherein the terminal casing is configured to enclose a rotatably mounted cylindrical paper roll that supplies paper to the printer, flat edges of the paper roll being substantially parallel to the base surface of the terminal.

31. The modular computer terminal of claim 30, wherein the printer is configured to print a receipt after the document scanner module scans a document, the receipt including a readable code linking the printed receipt to information associated with the scanned document, and wherein the modular computer terminal further comprises a code reader configured to read the code, the display module displaying the information associated with the scanned document when the code reader reads the code printed on the receipt.

32. The modular computer terminal of claim 31, further comprising a random access mass storage device, the storage device storing and allowing access to the information associated with the scanned document.

33. The modular computer terminal of claim 30, wherein the integrated printer includes a read-after-print mechanism to detect scanning or printing failures.

\* \* \* \* \*